US005086584A

United States Patent [19]
Merving

[11] Patent Number: 5,086,584
[45] Date of Patent: Feb. 11, 1992

[54] METHOD AND APPARATUS FOR APPLYING HERBICIDE AND THE LIKE TO TREES

[75] Inventor: Hans A. K. Merving, Torshalla, Sweden

[73] Assignee: Forestry Injection Company FIC AB, Eskilstuna, Sweden

[21] Appl. No.: 420,258

[22] Filed: Oct. 12, 1989

[51] Int. Cl.⁵ .................................................. A01G 29/00
[52] U.S. Cl. ....................................... 47/57.5; 47/48.5
[58] Field of Search ................. 47/57.5, 48.5; 221/30, 221/254, 250, 268, 271, 276

[56] References Cited

U.S. PATENT DOCUMENTS

| 4,308,689 | 1/1982 | Jenson et al. | 47/57.5 |
| 4,342,176 | 8/1982 | Wolfe | 47/57.5 |
| 4,344,250 | 8/1982 | Fahlstrom | 47/57.5 |
| 4,848,028 | 7/1989 | Johnson et al. | 47/57.5 |
| 4,908,983 | 3/1990 | Mazur et al. | 47/57.5 |

*Primary Examiner*—David A. Scherbel
*Assistant Examiner*—Linda J. Watson
*Attorney, Agent, or Firm*—Fleit, Jacobson, Cohn, Price, Holman & Stern

[57] ABSTRACT

A method for treating a tree comprises the steps of punching at least one hole in a trunk of a tree and injecting an individual chemical pellet directly into the at least one hole. The chemical pellet dissolves in and mixes with sap of the tree to treat the tree. A dispenser for injecting the pellets and a punch hammer for punching holes in the tree, both of which are used in the tree treating method, are also disclosed.

7 Claims, 5 Drawing Sheets

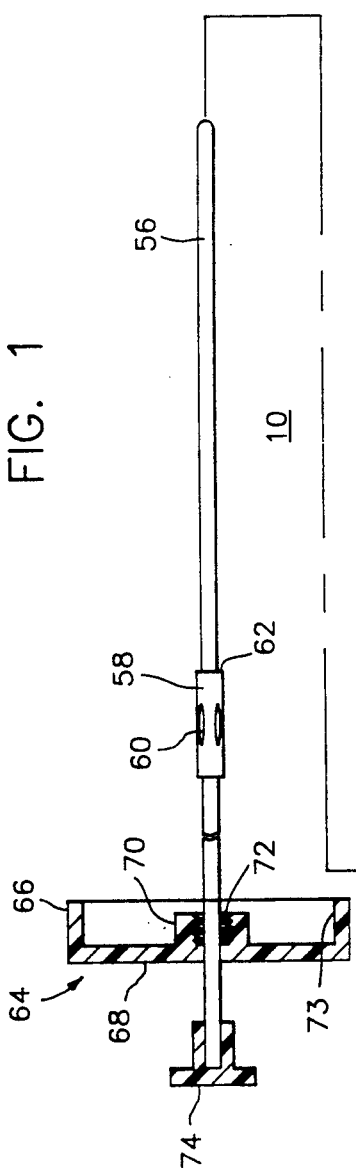
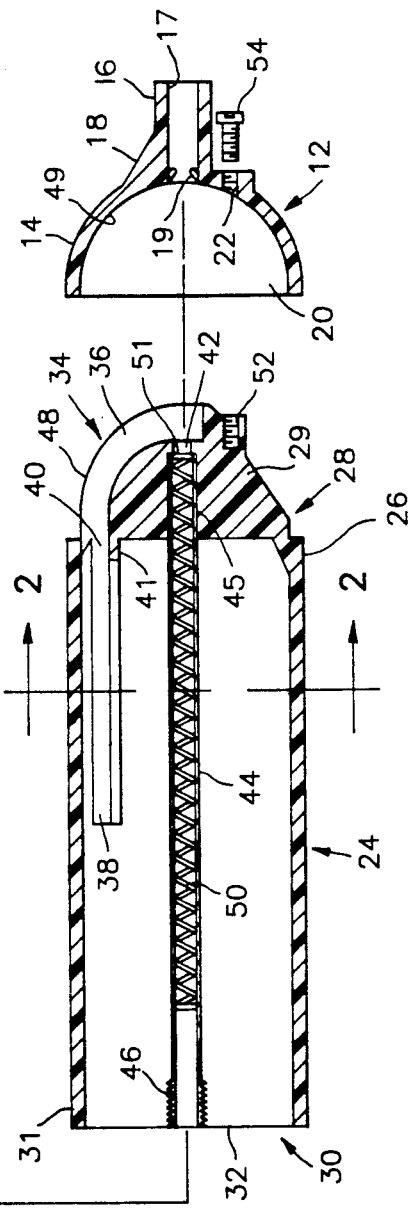
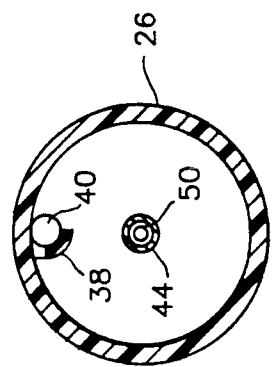
FIG. 1
FIG. 2

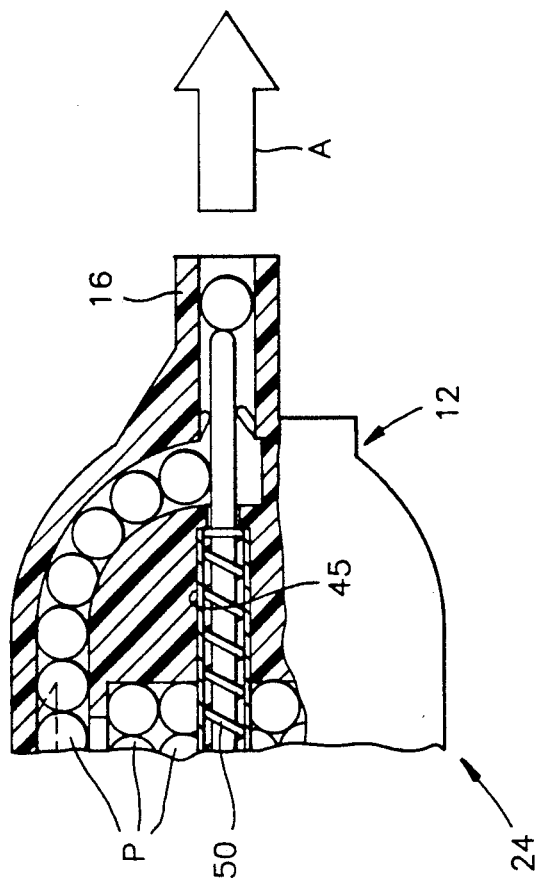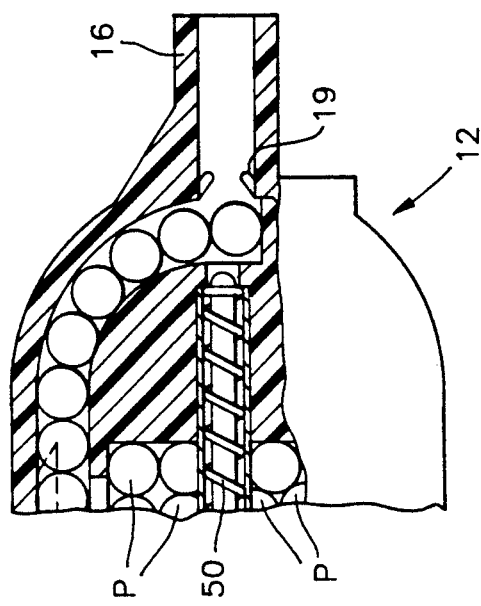

METHOD AND APPARATUS FOR APPLYING HERBICIDE AND THE LIKE TO TREES

The present invention relates to a method of applying herbicide or other types of chemicals, such as fertilizers or the like, to selected trees or other vegetation. The method involves a dry punching procedure that meets strict regulations concerning environmental protection.

BACKGROUND OF THE INVENTION

Presently, timber is often harvested by a system of clear cutting an area of a forest. Because of its advantageous biological and economical characteristics, clear cutting will probably continue to be used as a harvesting method for the foreseeable future. However, since an area which has been clear cut is typically exposed to a great deal of light, growth of sprouts from the roots or stumps of certain types of felled trees, forming a thicket, will occur. Such thickets are usually created when root-sprouting and coppice creating broadleaf deciduous trees are felled.

Small trees in a thicket can cause a great deal of damage to conifer seedlings, since small trees in the thicket compete with the conifer seedlings for available nourishment and light. Aspen is the most troublesome thicket producing tree, due to its high rate of regeneration Also, a fungus known as *melampsora pinitorqua*, which attacks both aspen leaves and pine seedlings, may be transmitted from small aspen trees in a thicket to pine seedlings, causing great damage to conifer plantations.

In previous years, thicket growth has been controlled by spraying herbicides from the air or by hand to kill thickets originating from felled deciduous trees. Presently, however, due to environmental concerns, spraying of herbicides from the air is no longer allowed. Also, manual spraying of herbicide tends to expose individuals to the herbicide. Therefore, it is preferable to control thicket growth in another way.

Heretofore, the only solution to this problem was to let the thicket grow and then remove it with bush saws, a method which is costly and necessitates the use of much manpower.

SUMMARY OF THE INVENTION

It is accordingly a primary object of the present invention to provide another method of eliminating undesirable thickets from conifer plantations. This method involves notching, i.e., punching holes in, individual hardwood trees in the conifer plantations, and dispensing herbicide into the holes. The hardwood trees are individually killed, and root sprouts and coppices will not grow in the plantation areas. This notching treatment can be used for all species of trees or tree like bushes in agriculture and gardening applications, as well as in forestry applications. The dosage of herbicide utilized to kill the tree is clearly dependent on the resistance of the tree species to the particular herbicide used. The method can also be used to thin young conifer stands where no profit from harvesting is required.

The present invention makes personal contact with the herbicide pellets less likely. There is no waste of herbicide, and soil will not be polluted. The present method is also faster and more convenient than earlier methods. Approximately 1800 injection treatments per working day may be performed.

The above and other objects are accomplished according to the present invention through a method for treating a tree comprising the steps of punching at least one hole in a trunk of a tree and injecting an individual chemical pellet directly into the hole. The chemical pellet dissolves in and mixes with sap of the tree to treat the tree.

A dispenser for ejecting the chemical pellets also forms part of the invention. The dispenser comprises a body portion having first and second ends and a cavity provided therein for storing a plurality of pellets to be ejected. An ejection rod ejects an individual pellet from the dispenser. A dispensing spout is mounted on the first end of the body portion, and a wall at the first end of the body portion is interposed between the dispensing spout and the body portion. The wall includes a first aperture, allowing stored pellets to exit from the cavity, a second aperture allowing the ejection rod to eject the individual pellet, and a guide ramp for guiding pellets from the cavity to the first aperture and from the first aperture towards the second aperture and into alignment with the second aperture The ejection rod is operable to protrude through the second aperture into contact with a pellet aligned with the second aperture and force the pellet through the dispensing spout and out of the dispenser.

The invention additionally concerns a punch hammer for punching holes in a tree for the chemical pellets. The punch hammer comprises a head having a longitudinal bore extending therethrough from front to rear of the head, a handle on which the head is mounted for moving the head toward and away from the tree, and a hollow punch cylinder affixed within the longitudinal bore. The punch cylinder includes a rear portion secured within the longitudinal bore and a front portion protruding from the front of the head. The front portion of the punch cylinder is moved toward, driven into and penetrates the tree and forces a core of wood from the tree into the front portion of the punch cylinder. The core of material is retained in the punch cylinder and is removed from the tree when the punch hammer is withdrawn from the tree.

BRIEF DESCRIPTION OF THE DRAWINGS

A specific embodiment of the invention will now be described. Reference should be made to the accompanying drawings, wherein:

FIG. 1 is an exploded view, partly in section, of the dispenser of the invention;

FIG. 2 is a sectional view of the dispenser as seen along section line 2—2 of FIG. 1;

FIG. 3 is a view, partly in section, of a portion of the dispenser just to the moment when the ejection rod thereof is actuated;

FIG. 4 is a view, partly in section, of the same portion of the just after the ejection rod has been actuated;

DESCRIPTION OF THE PREFERRED EMBODIMENT

Figure 5:
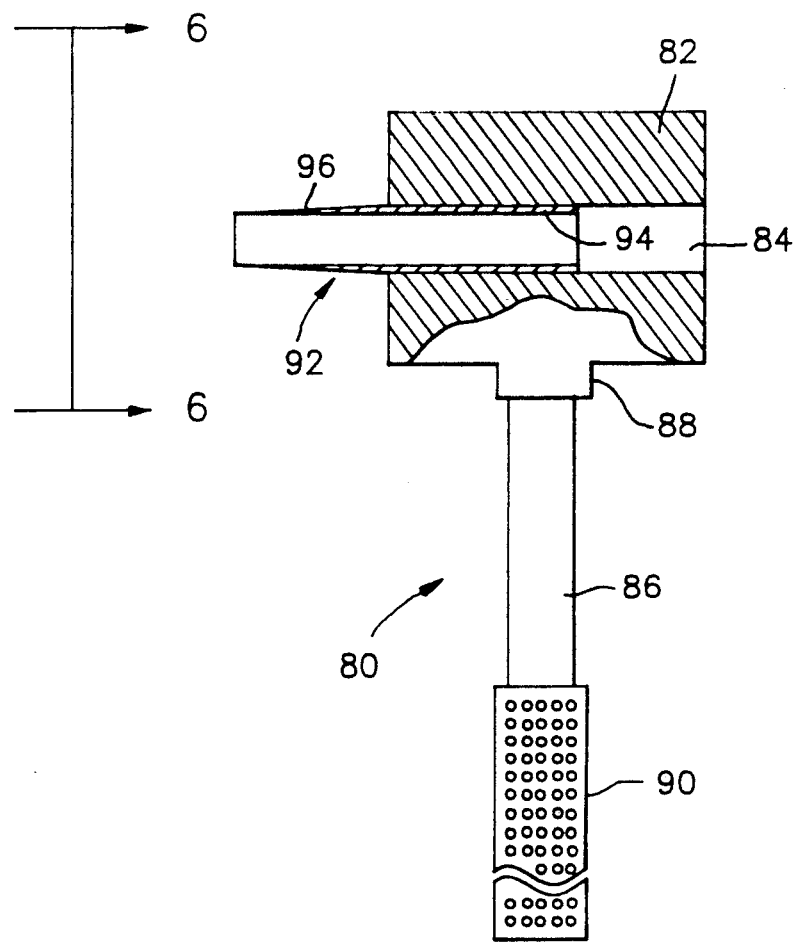
FIG. 5 is a view, partly in section, of the punch hammer according to the present invention.

Referring now to FIG. 1, an ejector or dispenser according to the present invention is illustrated in an exploded view and is generally designated by reference number 10. The dispenser includes a front end cap 12 having a curved portion 14 which, in the illustrated embodiment, approximates the form of half of a sphere. The front end cap 12 also includes a dispensing spout 16 extending away from the outer surface of the cap and having a central bore 17. One or more reinforcing ribs 18 may be provided between the exterior surface of curved portion 14 and the exterior surface of dispensing spout 16. At the inner end of central bore 17, flexible tabs 19 are provided for a purpose which will become apparent. As is clear from FIG. 1, front end cap 12 is hollowed out to form a hollow interior 20. An aperture 22 is also provided in cap 12 for a purpose which will become apparent presently.

The dispenser 10 also includes a central body portion 24. Central body portion 24, in the illustrated embodiment, includes a cylindrical outer wall 26, a closed front end 28, and a rear end 30. Front end 28 of central body portion 24 is closed by wall 29 integrally formed with the outer wall 26 of body portion 24. Cylindrical outer wall 26 forms a boundary for hollow cavity 32 of the body portion. A guide ramp 34 is formed on the forward portion of wall 29. The guide ramp 34 includes a curved, e.g., part circular, front groove portion 36 which smoothly merges into an elongated extension portion 38 extending rearwardly into hollow cavity 32. Guide ramp 34 is provided as a guide for herbicide pellets P, which are used to treat the tree. As is clear from FIGS. 1-4, guide ramp 34 functions to guide pellets P directly to a pellet feed aperture 40. Both groove portion 36 and extension portion 38 are provided with a curvature which corresponds to the outer surface curvature of substantially circular pellets P, as can be seen from FIGS. 2-4.

Also formed in the wall 29 is a pellet ejection aperture 42. A center tube 44, which extends along the longitudinal center axis of body portion 24, is affixed to the cap 29. Center tube 44 has a hollow interior which is aligned with pellet ejection aperture 42. In the illustrated embodiment, the center tube 44 has a front end 45 which is molded or otherwise affixed to the cap 29. Tube 44 is also provided with a threaded rear end 46.

Front end cap 29 is also provided with a curved outer surface 48, forming the exterior of the front groove portion 36, which engages the curved inner surface 49 of hollow interior 20 of front end cap 12 when front end cap 12 is secured to body portion 24. A compressible coil spring 50, having a free length less than the length of tube 44, as shown in FIG. 1, is provided in the hollow interior of center tube 44. Pellet ejection aperture 42 is formed with a smaller diameter than the hollow interior of center tube 44 so as to form a first abutment shoulder 51 for the coil spring. Cap 29 further includes a threaded recess 52 into which a screw 54, passing through aperture 22 in front cap 12 is received. The cooperation between threaded recess 52 and screw 54 is effective to attach front end cap 12 to body portion 24 in such a manner that the curved inner surface 49 of hollow interior 20 tightly engages curved outer surface 48 of front groove portion 36.

An ejection rod 56 is dimensioned to be received within the hollow interior of center tube 44. The front end portion of ejection rod 56 is additionally received within the radial interior of the coils of compressible coil spring 50. A collar 58 is attached, e.g., by spotwelds 60, to a middle portion of the ejection rod 56. Collar 58 forms a second abutment shoulder 62 for coil spring 50 and abuts the free end of coil spring 50, as is apparent from FIG. 1.

In order to close off the hollow interior 32 of body portion 24 from the environment, a rear end cap 64 is provided. Rear end cap 64 includes a flat base portion 68 and a radially outer circumferential flange 66. As is apparent from FIG. 1, ejection rod 56 extends through a bore formed in the flat base portion 68 and outside of the dispenser. The rear end cap further includes an upstanding central extension 70 having a threaded interior 72. Threaded interior 72 cooperates with threaded rear end 46 of center tube 44 to threadedly attach rear end cap 64 to body portion 24 and close the dispenser. When the threaded interior 72 of central extension 70 is threadedly engaged with end 46 of center tube 44 and rear end cap 64 is secured to body portion 24, spring 50 is compressed between abutment shoulders 51 and 62 and tends to force ejection rod 56 outwardly of hollow interior 32, i.e., to the left in FIG. 1. A push button end cap 74 is provided at the outermost end of ejection rod 56.

Center tube 44, coil spring 50, screw 54, ejection rod 56 and collar 58 are preferably made of a suitable metal or metal alloy, such as aluminum, steel or the like. The remaining elements of dispenser 10 are preferably formed of a suitable thermo-setting plastic material or, alternatively, of rubber material.

Dispenser 10 is utilized to eject herbicide or, alternatively, fertilizer pellets as follows. First, rear end cap 64 is removed from body portion 24 by unscrewing the rear end cap from its threaded engagement with rear end 46 of center tube 44. Solid chemical pellets P are then filled into hollow interior 32 of the device. The rear end cap is then replaced and screwed back onto end 46 of tube 44. Dispenser 10 is pointed downwardly, i.e., oriented so that spout 16 points toward the ground. The dispenser is then manually shaken by the user, and, as a result, a plurality of pellets contact ramp 34 and are guided from the interior 32 of the device so as to roll along extension portion 38, through pellet feed aperture 40 and into curved front groove portion 36 of cap 29. Extension portion 38 is spaced from the interior of wall 26 a distance slightly greater than the diameters of pellets P. Front groove portion 36 is similarly dimensioned to be slightly larger than the diameters of pellets P. Because of the dimensions of front groove portion 36 and the spacing between curved interior surface 49 and curved exterior surface 48, the pellets are arranged in a single row in curved front groove portion 36.

Pellet ejection aperture 42 is smaller than the diameters of tree treatment pellets P. Once pellets have been fed into the curved front groove portion 36 of ramp 34, one pellet will be aligned with both central bore 17 and pellet ejection aperture 42, as shown in FIG. 3. It should be noted that this pellet is prevented from rolling out of bore 17 by flexible tabs 19 whenever dispenser 10 is pointed downwardly. Dispensing spout 16 is then inserted into a previously formed bore in a tree.

In order to eject the pellet, the user presses end cap 74, thereby forcing ejection rod 56 to be moved against the force of compressible coil spring 50, which is compressed between shoulders 51 and 62. The front end portion of ejection rod 56 will thus be forced through pellet ejection aperture 42 and into engagement with the pellet aligned with the pellet ejection aperture 42, as illustrated in FIGS. 3 and 4. Continued force application to end cap 74 will cause the ejection rod 56 to continue moving forwardly through the aperture 42.

The pellet is thus forced past flexible tabs 19 so that it can roll through central bore 17 and out of the dispenser 10 in the direction of arrow A, as illustrated in FIG. 4. Flexible tabs 19 also act to prevent a pellet from returning into the dispenser 10 once it has been partially ejected. Once an individual pellet has been ejected, force is removed from end cap 74 and spring 50 will act against shoulder 62 to force ejection rod 56 back into its original position. Another pellet P is then able to drop into position in front of aperture 42 so that it can be ejected from dispenser 10.

Figure 6:
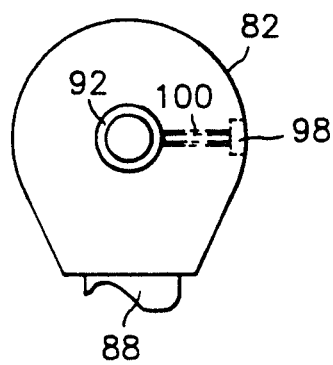
FIG. 6 is a view of the punch hammer as seen along line 6—6 of FIG. 5.

Referring now to FIGS. 5 and 6, a punch hammer 80 according to the present invention is illustrated. Punch hammer 80 is used to punch holes into which chemical pellets P are to be injected by removing a core of wood from the tree. Punch hammer 80 includes a head 82, having a longitudinal bore 84 extending from front to rear through the head. Head 82 is mounted on a handle 86, which is received within a handle receptacle 88. Handle 86 is retained within the handle receptacle 88 by a set screw, press fit or other such known attachment technique. At the lower end of handle 86, a rubber or plastic layer 90, forming a grip portion, is provided.

Affixed within longitudinal bore 84 in head 82 is a punch cylinder 92. Punch cylinder 92 includes a cylindrical rear portion 94, which is secured within bore 84, and a tapered front portion 96, which protrudes or extends from the front portion of head 82. The hollow interior of punch cylinder 92 is coaxially aligned with longitudinal bore 84. Referring to FIG. 6, it can be seen that a set screw 98, received within threaded bore 100, is used to secure the punch cylinder within bore 84 of head 82. Head 82 and handle 86 of punch hammer 80 may be formed from any type of carbon steel. However, due to the high strength requirements of punch cylinder 92, the punch cylinder is preferably formed of a high strength steel such as a tempered martensitic steel.

Figure 7:
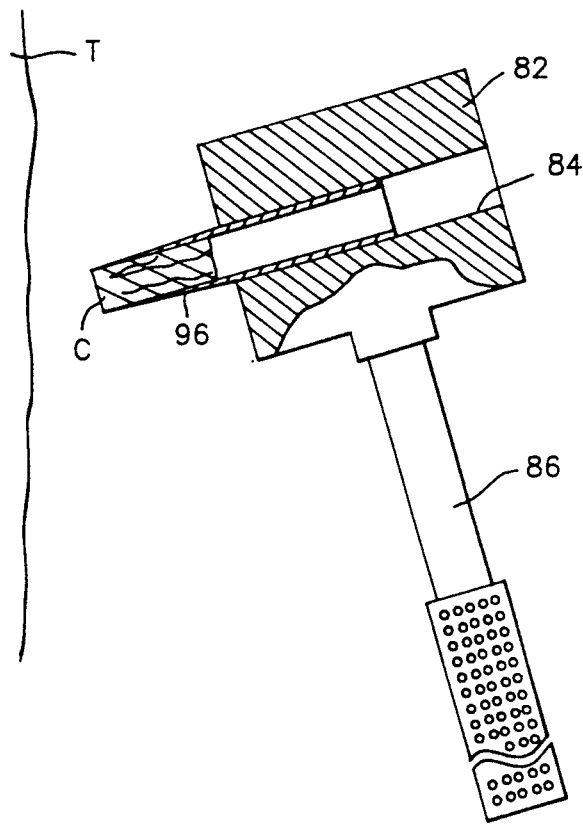
FIGS. 7 and 8 are views of the punch hammer as it is being driven into a tree.

In order to punch a hole in a tree, handle 86 of the hammer is grasped by grip portion 90 and the head 82 swung by the user towards a tree as shown in FIG. 7. The taper of front portion 96 of cylinder 92 facilitates penetration of the cylinder into the tree. Tapered front portion 96 of the punch cylinder contacts and penetrates the tree, as is apparent from FIGS. 7 and 8. Front portion 96 protrudes from the head 82 such a distance (e.g., 1 9/16") that it will pass into the phloem layer of a tree when it penetrates the tree. Head 82 of hammer 80 is of sufficient weight that it is relatively easy to drive the entire tapered front portion 96 of the punch into the trunk of the tree. In order to further facilitate driving tapered portion 96 into the trunk of the tree, the longitudinal balance point of punch hammer 80 is located much closer to head 82 than to the end of handle 86 opposite head 82.

Figure 8:
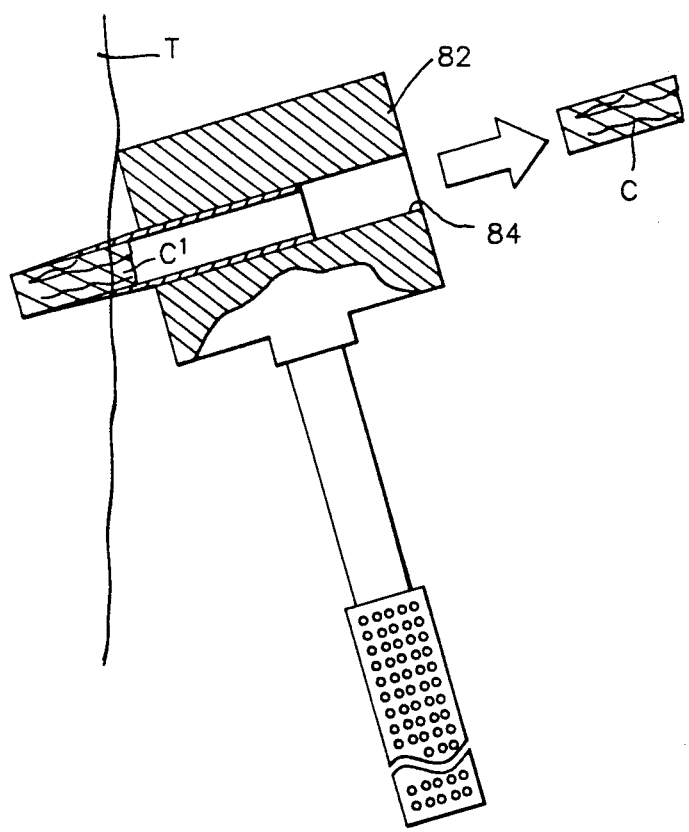

As the punch cylinder contacts the tree trunk T, a core of wood from the tree is forced into the hollow interior of punch cylinder 92, as is clear from FIGS. 7 and 8. Once the tapered front portion has been driven completely into the tree, the punch hammer is twisted in order to sever fibers of the wood between the core of wood and the rest of the tree. In particular, punch hammer 80 is manually twisted approximately 90° about the longitudinal axis of bore 84 and punch cylinder 92. Once it is severed, the core of wood is frictionally retained within the punch cylinder. The punch cylinder and severed core of wood are then withdrawn from the tree as hammer 80 is pulled away from the tree, and the core of wood retained within punch cylinder 92 is thus removed. To subsequently punch another hole in a different portion of the tree trunk, the user simply swings the punch hammer again towards the tree. As shown in FIG. 8, a core of wood C, which was previously forced into and retained within punch cylinder 92, is automatically ejected through the open rear portion of longitudinal bore 84 as a new core of wood C' is driven into the punch cylinder and contacts core of wood C. This process is repeated until a sufficient number of holes have been formed in the tree trunk so that the tree may be effectively treated with the herbicide used. It should be noted that the holes are formed in the tree so that they extend, at approximately 30° relative to a horizontal direction, downward towards the ground.

Once a sufficient number of holes have been formed in the tree with punch hammer 80, punch hammer 80 may be set aside. Dispenser 10, containing herbicide pellets P, is then utilized to dispense pellets individually into the holes which have been formed in the tree. In particular, dispensing spout 16 is placed in one of the holes. End cap 74 is pressed, and an individual pellet P is ejected from the dispenser in the manner described above into each hole. As noted previously, the holes are punched in the trees so that they extend downwardly. Thus, once a pellet P has been ejected from dispenser 10 into a punch hole, the pellet will not fall out of the hole; gravity will cause the pellet to remain in place.

Figure 9:
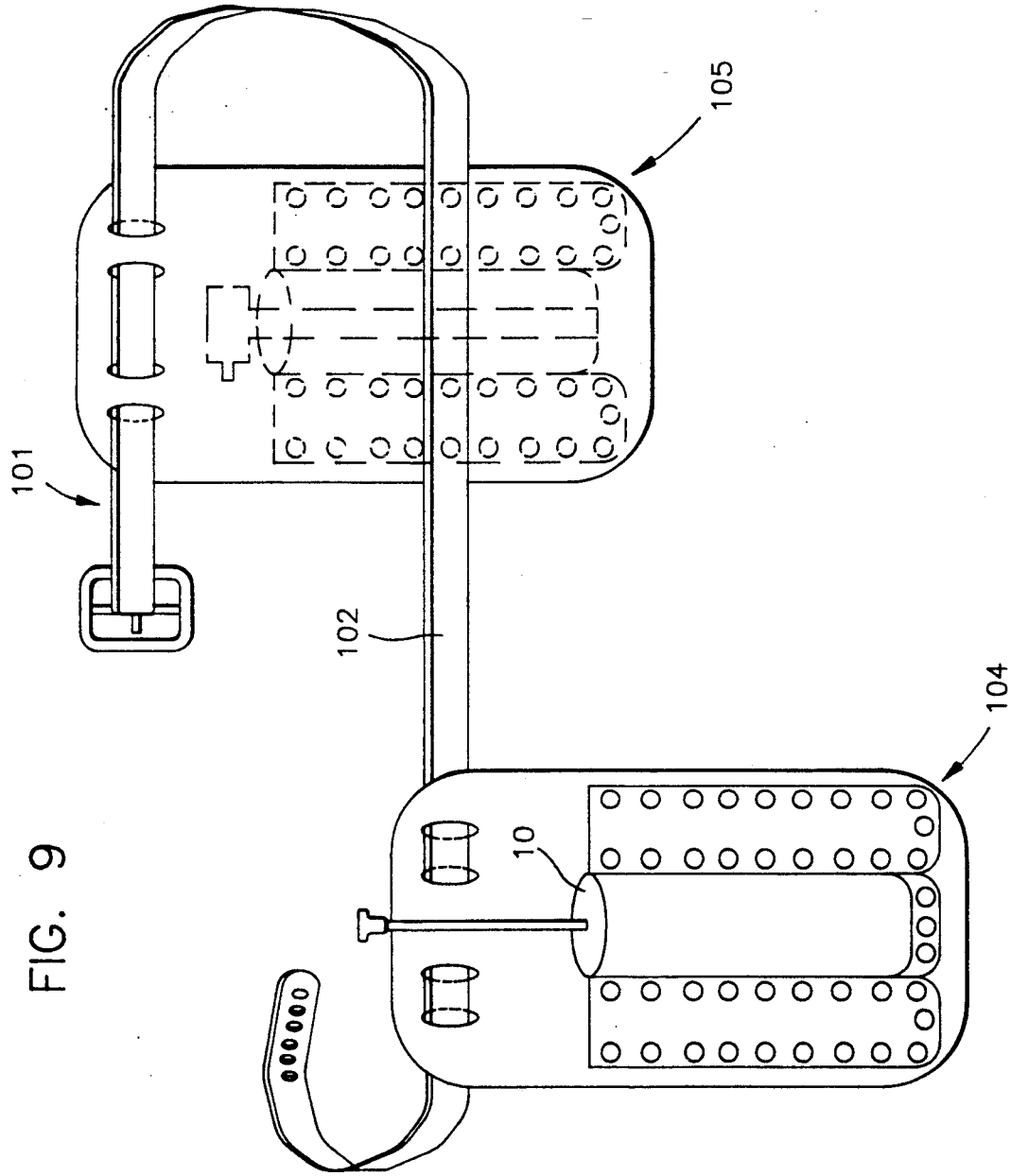
FIG. 9 is a view of a belt which may be used to store and carry the dispenser and punch hammer of the present invention.

Referring now to FIG. 9, a carrying belt or harness 101 for dispenser 10 and punch hammer 80 is illustrated. The harness is designed to fit around the waist of a user and includes a belt 102 and a pair of tool receiving pockets 104 and 105. Harness 101 makes it easy for an operator to transport dispenser 10 and hammer 80, and provides a convenient storage location for either the dispenser 10 or hammer 80 when the other tool is being used.

Various modifications to the invention as specifically described above may occur to those skilled in the art. Such modifications are intended to be covered by the claims which follow.

I claim:

1. A method for treating a tree comprising the steps of:
   providing a punch hammer having a hollow cylinder affixed thereto;
   driving a portion of said hollow cylinder into a trunk of the tree so that a core of wood from the tree is forced into the portion of said hollow cylinder;
   twisting said punch hammer so as to twist said hollow cylinder and said core of wood relative to the tree to define at least one hole in the trunk of the tree;
   withdrawing said portion of said cylinder from the tree to form the at least one hole; and
   injecting an individual chemical pellet directly into said at least one hole, the chemical pellet dissolving in and mixing with sap of the tree to treat the tree.

2. A method for treating a tree as defined in claim 1, wherein said at least one hole is punched so that it extends downwardly towards the ground.

3. A method for treating a tree as defined in claim 1, wherein the individual chemical pellet is injected directly into each hole from a dispenser.

4. A method for treating a tree as defined in claim 1, and further comprising the steps of displacing a core of wood already present in said hollow cylinder as said core of wood is forced into the portion of the hollow cylinder and driving the core of wood already present in said hollow cylinder out of the hollow cylinder.

5. A method for treating a tree as defined in claim 3, wherein the dispenser has a volume filled with chemical pellets and a single chemical pellet at a time is ejected from said dispenser.

6. A method of forming a hole in a tree comprising the steps of:

providing a punch hammer having a hollow cylinder affixed thereto;

driving a portion of said hollow cylinder into a trunk of a tree so that a core of wood from the tree is forced into the hollow cylinder portion;

twisting said punch hammer so as to twist said cylinder and said core of wood relative to the tree; and withdrawing said cylinder from the tree to remove said core of wood, thereby forming said hole.

7. A method of forming a hole in a tree as defined by claim 6, wherein said hole is formed so that the hole extends downwardly towards the ground.

* * * * *